(12) United States Patent
Wen et al.

(10) Patent No.: US 11,900,661 B2
(45) Date of Patent: Feb. 13, 2024

(54) IMAGE PROCESSING METHOD, DEVICE, STORAGE MEDIUM AND CAMERA

(71) Applicant: BOYAN TECHNOLOGIES (SHENZHEN) CO., LTD, Shenzhen (CN)

(72) Inventors: Jiangtao Wen, Shenzhen (CN); Yuxing Han, Shenzhen (CN); Yanghao Li, Shenzhen (CN); Jiawen Gu, Shenzhen (CN); Rui Zhang, Shenzhen (CN)

(73) Assignee: BOYAN TECHNOLOGIES (SHENZHEN) CO., LTD, Shenzhen (CN)

( * ) Notice: Subject to any disclaimer, the term of this patent is extended or adjusted under 35 U.S.C. 154(b) by 515 days.

(21) Appl. No.: 17/116,890

(22) Filed: Dec. 9, 2020

(65) Prior Publication Data
US 2021/0250495 A1 Aug. 12, 2021

(30) Foreign Application Priority Data
Feb. 10, 2020 (CN) .......................... 202010085056.7

(51) Int. Cl.
*G06V 10/82* (2022.01)
*G06N 3/04* (2023.01)
(Continued)

(52) U.S. Cl.
CPC ............... *G06V 10/82* (2022.01); *G06N 3/04* (2013.01); *G06V 10/764* (2022.01);
(Continued)

(58) Field of Classification Search
CPC .. G06V 10/82; G06V 10/764; G06V 10/7715; G06V 10/454; G06V 10/806;
(Continued)

(56) References Cited

U.S. PATENT DOCUMENTS 10,319,115 B2 * 6/2019 Park .................... G06N 3/045
10,417,498 B2 9/2019 Hori et al.
(Continued)

FOREIGN PATENT DOCUMENTS

CN 107886117 A 4/2018
CN 109948725 A 6/2019
(Continued)

OTHER PUBLICATIONS

Ulku, Arin Can et al., "A 512×512 SPAD Image sensor With Integrated Gating for Widefield FLIM", IEEE Journal of Selected Topics in Quantum Electronics, Dec. 21, 2018, pp. 1-12, vol. 25, No. 1, IEEE.
(Continued)

*Primary Examiner* — Michael S Osinski
(74) *Attorney, Agent, or Firm* — Myers Wolin, LLC (57) ABSTRACT

An image processing method, device, storage medium and camera are provided. The method, applied to the camera, comprises: capturing a target image; acquiring a target feature map of the target image through a preset target convolution layer, wherein the target convolution layer includes at least one of a plurality of convolution layers of a convolutional neural network (CNN); and outputting the target feature map. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission.

7 Claims, 4 Drawing Sheets

(51) Int. Cl.
*G06F 18/213* (2023.01)
*H04N 23/80* (2023.01)
*G06V 10/764* (2022.01)
*G06V 10/77* (2022.01)

(52) U.S. Cl.
CPC ......... *G06V 10/7715* (2022.01); *H04N 23/80* (2023.01); *G06F 18/213* (2023.01)

(58) Field of Classification Search
CPC ........ G06V 10/25; G06V 10/44; G06V 20/64; G06V 30/19173; G06F 18/213; G06F 18/214; G06F 18/253; G06F 18/2431; G06N 3/04; G06N 3/045; G06N 3/08; G06N 3/084; H04N 23/80; H04N 23/611; G06T 2207/20084; G06T 7/11; G06T 2207/20081; G06T 3/4046; G06T 17/00; G06T 2200/08

See application file for complete search history.

(56) References Cited

U.S. PATENT DOCUMENTS

| | | | | |
|---|---|---|---|---|
| 10,635,951 | B1* | 4/2020 | Liu | G06V 10/82 |
| 10,878,272 | B2* | 12/2020 | Saito | G06V 20/52 |
| 11,244,191 | B2* | 2/2022 | Yao | G06V 10/7715 |
| 11,521,095 | B2* | 12/2022 | Wang | G06N 3/045 |
| 11,636,613 | B2* | 4/2023 | Chen | G06T 7/75 345/419 |
| 2019/0303731 | A1* | 10/2019 | Yang | G06N 3/08 |
| 2021/0158699 | A1* | 5/2021 | Yang | G08G 1/09623 |
| 2021/0209339 | A1* | 7/2021 | You | G06V 20/58 |
| 2021/0216747 | A1* | 7/2021 | Rodyushkin | G06V 20/64 |
| 2021/0256290 | A1* | 8/2021 | Wu | G06V 10/82 |
| 2021/0266565 | A1* | 8/2021 | Zhou | H04N 19/124 |
| 2021/0286977 | A1* | 9/2021 | Chen | G06T 17/00 |
| 2021/0349943 | A1* | 11/2021 | Aksu | G06F 16/75 |
| 2021/0406600 | A1* | 12/2021 | Chae | G06V 10/7747 |
| 2022/0004808 | A1* | 1/2022 | Yuan | G06V 10/26 |
| 2022/0108452 | A1* | 4/2022 | Xiang | G06V 10/7715 |
| 2022/0222831 | A1* | 7/2022 | Huang | G06T 7/174 |
| 2022/0253974 | A1* | 8/2022 | Gao | G06T 3/4046 |
| 2023/0036359 | A1* | 2/2023 | Cheng | G06T 3/4053 |

FOREIGN PATENT DOCUMENTS

| | | |
|---|---|---|
| CN | 110009027 A | 7/2019 |
| CN | 110309876 A | 10/2019 |

OTHER PUBLICATIONS

Zhu, Zheng et al., "Distractor-aware Siamese Networks for Visual Object Tracking", ECCV, 2018, pp. 1-17, The Computer Vision Foundation.

Li, Bo et al., "High Performance Visual Tracking with Siamese Region Proposal Network", CVF Conference on Computer Vision and Pattern Recognition, 2018, pp. 8971-8980, IEEE.

The First Office Action issued by the China Intellectual Property Administration for corresponding Chinese Patent Application No. 202010085056.7, dated Dec. 22, 2020.

* cited by examiner

IMAGE PROCESSING METHOD, DEVICE, STORAGE MEDIUM AND CAMERA

CROSS REFERENCE TO RELATED APPLICATIONS

The present application claims a priority to Chinese Application No.: CN 202010085056.7, filed on Feb. 10, 2020, the content of which is incorporated by reference in its entirety for all purposes.

FIELD OF THE DISCLOSURE

The present disclosure relates to the field of an image processing technology, in particular to an image processing method, device, storage medium and camera.

BACKGROUND

With the development of a single-photon avalanche diode (SPAD) in a standard complementary metal oxide semiconductor (CMOS) technology and unveiling of an SPAD array, an SPAD image sensor has been extensively applied to the fields of object identification, classification and detection. In the relevant technologies, a target image reconstruction map is acquired by a reconstruction method after an SPAD camera captures and outputs a target image, and then the reconstruction map is input into a specific convolutional neural network (CNN) to obtain a final output result. However, there is a long delay when the SPAD camera transmits the target image for large data volume of the target image, and the large data volume transmission has a high demand on bandwidth.

SUMMARY

For the purpose of solving the above problems, the present disclosure provides an image processing method, device, storage medium and camera.

In the first aspect, the present disclosure provides an image processing method, applied to a camera, comprising: capturing a target image; acquiring a target feature map of the target image through a preset target convolution layer, wherein the target convolution layer includes at least one of a plurality of convolution layers of a convolutional neural network (CNN); and outputting the target feature map.

In the second aspect, the present disclosure provides an image processing device, applied to a camera, comprising: a capture module configured for capturing a target image; a feature map acquisition module configured for acquiring a target feature map of the target image through a preset target convolution layer, wherein the target convolution layer includes at least one of a plurality of convolution layers of a convolutional neural network (CNN); and an output module configured for outputting the target feature map.

In the third aspect, the present disclosure provides a non-temporary computer-readable storage medium on which a computer program is stored, wherein the steps of the method in the first aspect of the present disclosure are realized when the program is executed by the processor.

In the fourth aspect, the present disclosure provides a camera comprising: a memory on which a computer program is stored; and a processor configured to execute the computer program in the memory to realize the steps of the method in the first aspect of the present disclosure.

Through the above technical solution, a target image is captured; a target feature map of the target image through a preset target convolution layer is acquired, wherein the target convolution layer includes at least one of a plurality of convolution layers of a convolutional neural network (CNN); and the target feature map is output. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission.

Other features and advantages of the present disclosure will be elaborated in the following Detailed Description.

BRIEF DESCRIPTION OF THE DRAWINGS

The drawings provide further understanding of the present disclosure and are part of the Description, interpret the present disclosure together with the specific implementations below, but don't constrain the present disclosure. In the drawings.

DETAILED DESCRIPTION OF THE DISCLOSURE

The specific implementations of the present disclosure will be elaborated in combination with the drawings below. It should be understood that the specific implementations depicted herein are only used for depicting and explaining the present disclosure, without any limit to the present disclosure.

Firstly, the application scenarios of the present disclosure are depicted. With ultrahigh frame rate and high dynamic scope, an SPAD image sensor has been extensively applied to the fields of object identification, classification and detection. At present, the application for SPAD is still stayed at the stages of detection and basic image application, without considering SPAD features from system perspective. In the relevant technologies, an image processing system may include an SPAD camera, a reconstruction unit and a neural network, wherein the SPAD camera is used for acquiring the target image (1-bit image) and transmitting the same to the reconstruction unit, and processing the same correspondingly using an algorithm in the existing red-green-blue (RGB) domain after the reconstruction unit reconstructs the target image. Therefore, the reconstructed image is necessarily obtained from a hardware system (reconstruction unit) by the image processing system, and then analyzed by a software system (neural network). However, transmission of the target image to the software system from the hardware system will increase the demand for the bandwidth between the software and hardware systems, and the time delay between a plurality of processing flows will be longer.

For the purpose of solving the above problems, the present disclosure provides an image processing method, device, storage medium and camera. A target image is captured; a target feature map of the target image through a preset target convolution layer is acquired, wherein the target convolution layer includes at least one of a plurality of convolution layers of a convolutional neural network (CNN); and the target feature map is output. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission.

Figure 1:
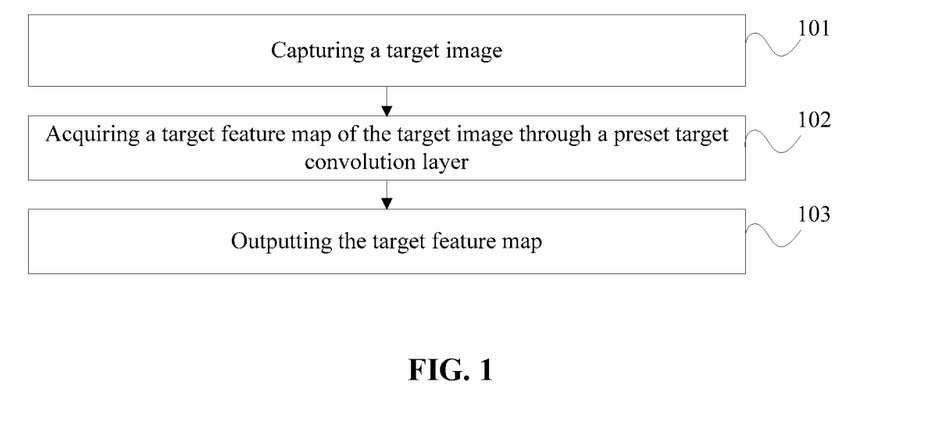
FIG. 1 shows a flow chart of an image processing method provided by an embodiment of the present disclosure.

FIG. 1 illustrates a flow chart of an image processing method provided by an embodiment of the present disclosure, and the method is applied to the camera. As shown in FIG. 1, the method may comprise the following steps:

S101, capturing a target image.

Wherein the camera for capturing the target image may be selected by a specific application scenario. For example, in a target detection system, the camera may be an SPAD camera.

In this step, the camera may capture the target image in various ways, for example, the way that the camera captures the target image may be controlled based on the specific demand; for example, the camera may be controlled to capture the target image once at every preset duration, or to capture a plurality of target images within the preset duration. Here, the camera may be the SPAD camera or other kinds of cameras. The present disclosure does not limit the type of the camera.

S102, acquiring a target feature map of the target image through a preset target convolution layer.

Wherein the target convolution layer may include at least one of a plurality of convolution layers of a convolutional neural network (CNN), for example, the target convolution layer may be several previous convolution layers among the plurality of convolution layers of the CNN, and the target convolution layer may be pre-integrated in the camera.

In this step, after capturing the target image, the camera may process the target image through the target convolution layer pre-integrated in the camera, so as to obtain the processed target feature map. For example, for a face detection system, after capturing the target image, the camera may acquire the target feature map of facial key points from the target image through the target convolution layer, and the target feature map filtrates the feature map of facial non-key points, and thus the data volume of the target feature map is smaller than that of the target image.

S103, outputting the target feature map.

In this step, after acquiring the target feature map corresponding to the target image through the target convolution layer, the camera may output the target feature map. For example, the target feature map may be transmitted to other convolution layers of the CNN, and then input into other convolution layers. On account that the data volume of the target feature map is smaller than that of the target image, the camera transmits the target feature map faster so as to shorten the transmission delay.

With the above method, after capturing the target image, the camera acquires the target feature map of the target image through the preset convolution layer, and then outputs the target feature map. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission.

Figure 2:
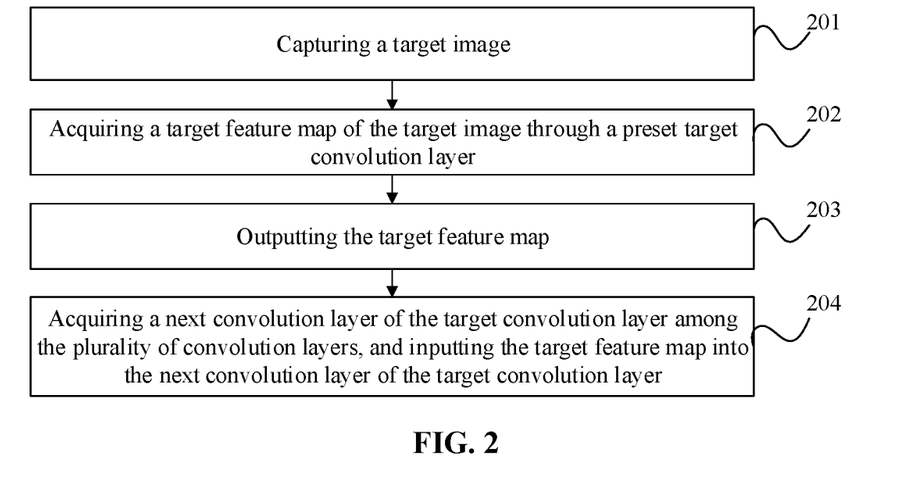
FIG. 2 shows a flow chart of another image processing method provided by an embodiment of the present disclosure.

FIG. 2 illustrates a flow chart of another image processing method provided by an embodiment of the present disclosure. As shown in FIG. 2, the method may comprise the following steps:

S201, capturing a target image.

S202, acquiring a target feature map of the target image through a preset target convolution layer.

Wherein the target convolution layer may include at least one of a plurality of convolution layers of a convolutional neural network (CNN), for example, the target convolution layer may be several previous convolution layers among the plurality of convolution layers of the CNN, and the target convolution layer may be pre-integrated in the camera. The CNN may be preset based on the specific demands. For example, if the captured target image is used for face recognition, the CNN may be a neural network including a plurality of convolution layers, and each convolution layer is used for extracting different face feature maps.

It should be noted that the camera spends more time in transmitting the target image to the CNN and needs the sufficient bandwidth to transmit the target image between hardware and software systems due to the fact that the data volume of the target image captured by the camera is large. Hence, a part of convolution layers in the CNN may be integrated in the camera. After capturing the target image, the camera processes the target image captured correspondingly to obtain the target feature map through the part of convolution layers, and then transmits the target feature map to other convolution layers of the CNN, wherein the data volume of the target feature map is smaller than that of the target image, leading to faster transmission speed.

In a possible implementation way, the data volume of the feature map output by each of the plurality of convolution layers of the CNN may be acquired, and the target convolution layer is determined among the plurality of convolution layers based on the data volume.

After capturing the target image, the camera may acquire the data volume of the target image. The data volume may be a size of the target image, for instance, the data volume of the target image is 2 M. Later on, the target image may be input into the CNN to acquire the data volume of the feature map output by the first convolution layer of the CNN; the feature map is input into the second convolution layer to continuously acquire the data volume of the feature map output by the second convolution layer, and so forth to acquire the data volume of the feature map output by each convolution layer of the CNN.

Furthermore, the bandwidth of the image transmission between the camera and the neural network may be acquired and a data volume threshold for transmission supported by the width is determined; the target data volume that is less than or equal to the data volume threshold is acquired among the data volumes of the feature maps output by all convolution layers of the above acquired CNN, and the edge convolution layer corresponding to the target data volume and the previous convolution layer(s) of the edge convolution layer among the plurality of convolution layers are used as the target convolution layers. For example, if the data volume threshold is 2 M and the data volume of the target image is 3.5 M, the target image is input into the plurality of convolution layers of the CNN. The data volume of the feature map output by the first convolution layer f the CNN is 3 M, the data volume of the feature map output by the second convolution layer is 2.6 M, the data volume of the feature map output by the third convolution layer is 2.2 M, and the data volume of the feature map output by the fourth convolution layer is 1.6 M. It may be determined that the fourth convolution layer is the edge convolution layer, and the previous convolution layers of the fourth convolution layer include the first convolution layer, the second convolution layer and the third convolution layer. In this way, the first convolution layer, the second convolution layer, the third convolution layer and the fourth convolution layer may be used as the target convolution layers.

In another possible implementation way, a plurality of convolution layers with the data volume of the output feature map less than the data volume threshold may be acquired from the convolution layers of the neural network, and a feature extraction effect corresponding to each of the plurality of convolution layers is acquired to determine the convolution layer with the best feature extraction effect among the plurality of convolution layers as the edge convolution layer. For example, if the data volume threshold is 2.5 M and the data volume of the target image is 3.5 M, the target image is input into the CNN. The data volume of the feature map output by the first convolution layer of the CNN is 3 M, the data volume of the feature map output by the second convolution layer is 2.6 M, the data volume of the feature map output by the third convolution layer is 2.2 M, and the data volume of the feature map output by the fourth convolution layer is 2.4 M. Then the feature extraction effects corresponding to the third convolution layer and the fourth convolution layer may be acquired. If the feature extraction effect corresponding to the fourth convolution layer is better than the feature extraction effect corresponding to the third convolution layer, for instance, the recognition degree of the feature map output by the fourth convolution layer is higher for image recognition. It may be determined that the fourth convolution layer is the edge convolution layer, and the previous convolution layers of the fourth convolution layer include the first convolution layer, the second convolution layer and the third convolution layer. In this way, the first convolution layer, the second convolution layer, the third convolution layer and the fourth convolution layer may be used as the target convolution layers. Therefore, the target convolution layer may be determined by the data volume and the feature extraction effect, so that the determined target convolution layer is more reasonable, and the bandwidth required by image transmission may be saved without affecting the feature extraction effect.

It should be noted that the edge convolution layer may be determined based on the decrease proportion of the data volume of the feature map output by each of the plurality of convolution layers of the CNN relative to the data volume of the feature map input by the convolution layer when determining the target convolution layer, and the target convolution layer is determined based on the edge convolution layer. For example, if the data volume threshold is 2 M, the data volume of the target image is 3.5 M. The decrease proportion of the data volume corresponding to the first convolution layer of the CNN is 10%, the decrease proportion of the data volume corresponding to the second convolution layer is 20%, the decrease proportion of the data volume corresponding to the third convolution layer is 20%, and the decrease proportion of the data volume corresponding to the fourth convolution layer is 10%. Then, based on the decrease proportions corresponding to the four convolution layers, the edge convolution layer with the data volume of the output feature map less than the data volume threshold is determined, namely the fourth convolution layer, and then the target convolution layers may be determined to include the first convolution layer, the second convolution layer, the third convolution layer and the fourth convolution layer.

In another possible implementation way, the target convolution layer may be determined among the plurality of convolution layers of the CNN based on configuration information of the camera, for instance, processing capacity and memory space size of the processor. For example, the memory demand of each of the plurality of convolution layers may be determined, and the target convolution layer is determined based on the memory space size of the camera. In this way, partial computation may be completed in the camera after the target convolution layer is integrated in the camera, so as to save computing resources outside the camera.

Wherein the configuration information may include a first memory space corresponding to the camera, a second memory space required by each of the plurality of the convolution layers of the CNN may be acquired after obtaining the configuration information of the camera. Then a first sum value of the second memory space from the first convolution layer to the Nth convolution layer among the plurality of convolution layers may be obtained. If the first sum value is less than or equal to the first memory space, and a second sum value of the second memory space from the first convolution layer to the N+1th convolution layer is greater than the first memory space, the Nth convolution layer and the previous convolution layers of the Nth convolution layer among the plurality of convolution layers are used as the target convolution layers, where N is the integer greater than 0.

For example, the second memory space required by the first convolution layer may be acquired after obtaining the first memory space corresponding to the camera, and the second memory space required by the first convolution layer is used as the first sum value. Then, a second sum value of the second memory space required by the first convolution layer and the second memory space required by the second convolution layer is acquired. If the first sum value is less than or equal to the first memory space and the second sum value is greater than the first memory space, the first convolution layer is used as the target convolution layer. If the second sum value is less than or equal to the first memory space, the second sum value will be used as a new first sum value, then a sum value of the second memory space required by the second convolution layer and a memory space required by the third convolution layer will be acquired, and this sum value will be used as a new second sum value. If the new first sum value is less than or equal to the first memory space and the new second sum value is greater than the first memory space, the first convolution layer and the second convolution layer may be used as the target convolution layers. If the new second sum value is less than or equal to the first memory space, the above steps may be continued until the acquired new second sum value being greater than the first memory space, such that the target convolution layer may be determined.

It should be noted that the CNN may be subject to binarization processing in this present disclosure, namely, float parameters in the CNN structure are converted to +1 and −1 and operated using an XNOR instead of a multiplication, so that the computing speed and response speed of the CNN may be improved.

S203, outputting the target feature map.

S204, acquiring a next convolution layer of the target convolution layer among the plurality of convolution layers, and inputting the target feature map into the next convolution layer of the target convolution layer.

In this step, after outputting the target feature map, the camera may acquire the next convolution layer of the target convolution layer. Here, the next convolution layer of the target convolution layer may be acquired conveniently by identifying the plurality of convolution layers of the neural network. Later on, the target feature map may be input into the next convolution layer of the target convolution layer for further processing thereof.

Figure 3:
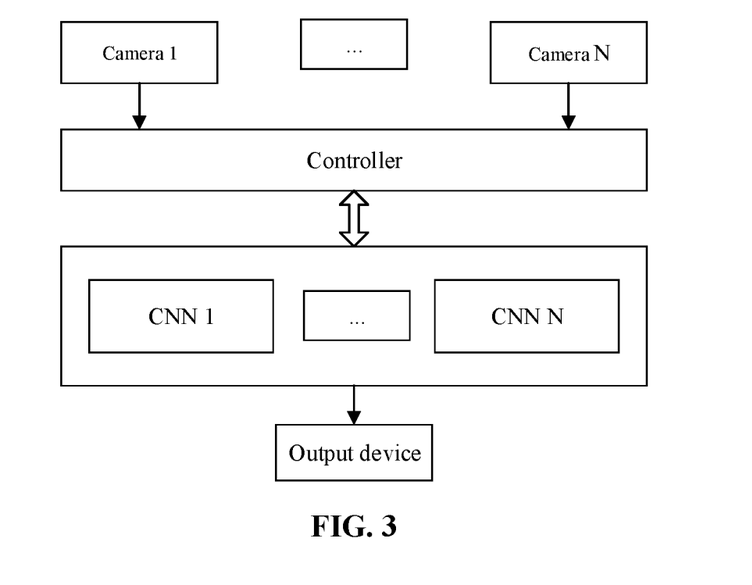
FIG. 3 shows an application diagram of an image processing method provided by an embodiment of the present disclosure.

It should be stated that there may be a plurality of the cameras in the present disclosure. As shown in FIG. 3, the image processing system includes N cameras, each of which is provided with the corresponding CNN in advance, namely from CNN 1 to CNN N. A controller in the image processing system may determine a target camera to be started among the plurality of cameras; after the target image is captured by the target camera, the target image may be processed by the CNN corresponding to each target camera, and then the processed result thereof is fed back to the system controller. For example, the controller may determine a camera 1 and a camera 3 as the target cameras among N cameras; after the camera 1 and the camera 3 capture a target image 1 and a target image 3, the target image 1 may be processed by the CNN 1, and then the target image 3 is processed by the CNN 3; later on, the CNN 1 and the CNN 3 may feedback the processing results of the target image 1 and the target image 3 to the controller. In this way, the controller may dynamically distribute the computing resources based on the selected target camera to shorten the processing delay, and may collaboratively process the processing result fed back by each CNN to improve system performance.

With the above method, after capturing the target image, the camera acquires the target feature map of the target image through the preset target convolution layer, and then outputs the target feature map. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission. Furthermore, in an embodiment of the present disclosure, the target image may be pre-processed for partial computing by the target convolution layer pre-integrated in the camera, so as to save the computing resources outside the cameras.

Figure 4:
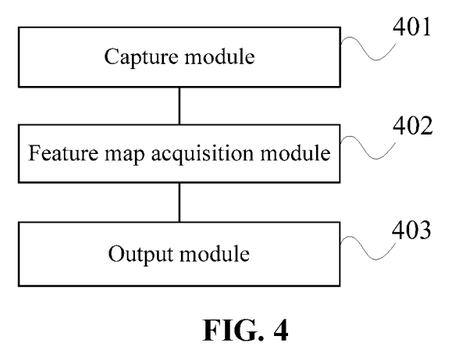
FIG. 4 shows a structure diagram of an image processing device provided by an embodiment of the present disclosure.

FIG. 4 illustrates a structure diagram of an image processing device applied to a camera provided by an embodiment of the present disclosure. As shown in FIG. 4, the device comprises:
- a capture module 401 configured for capturing a target image;
- a feature map acquisition module 402 configured for acquiring a target feature map of the target image through a preset target convolution layer, wherein the target convolution layer includes at least one of a plurality of convolution layers of a convolutional neural network (CNN);
- an output module 403 configured for outputting the target feature map.

Optionally, the feature map acquisition module 402 is specifically configured for: acquiring the data volume of the feature map output by each of the plurality of convolution layers of the CNN, and determining the target convolution layer among the plurality of convolution layers based on the data volume.

Optionally, the feature map acquisition module 402 is further configured for: obtaining a data volume threshold; determining an edge convolution layer based on the data volume and the data volume threshold; and using the edge convolution layer and the previous convolution layer(s) of the edge convolution layer among the plurality of convolution layers as the target convolution layers.

Optionally, obtaining a data volume threshold includes: obtaining a preset bandwidth for image transmission between the camera and the CNN; and using a data volume supported by the preset bandwidth as the data volume threshold.

Optionally, the feature map acquisition module 402 is further configured for: acquiring a target data volume that is less than or equal to the data volume threshold among the data volume, and using a convolution layer corresponding to the target data volume as the target convolution layer.

Optionally, the feature map acquisition module 402 is further configured for: obtaining a configuration information of the camera; and determining the target convolution layer among the plurality of convolution layers of the CNN according to the configuration information.

Optionally, the configuration information comprises a first memory space of the camera, and the feature map acquisition module 402 is further configured for: obtaining a second memory space required by each of the plurality of convolution layers; and obtaining a first sum value of the second memory space from the first convolution layer to the Nth convolution layer among the plurality of convolution layers, wherein if the first sum value is less than or equal to the first memory space and a second sum value of the second memory space from the first convolution layer to the N+1th convolution layer is greater than the first memory space, the Nth convolution layer and the previous convolution layer(s) of the Nth convolution layer among the plurality of convolution layers are used as the target convolution layers, where N is the integer greater than 0.

Figure 5:
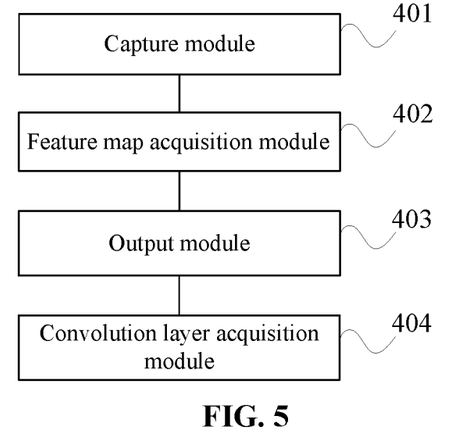
FIG. 5 shows a structure diagram of another image processing device provided by an embodiment of the present disclosure.

Optionally, as shown in FIG. 5, the device further comprises: a convolution layer acquisition module 404 configured for acquiring a next convolution layer of the target convolution layer among the plurality of convolution layers, and inputting the target feature map into the next convolution layer of the target convolution layer.

With the above device, after capturing the target image, the camera acquires the target feature map of the target image through the preset target convolution layer, and then outputs the target feature map. That is to say, after the target image is captured by the camera, the target feature map may be acquired by processing the target image through the target convolution layer pre-integrated in the camera. In this way, the camera transmits the target feature map only to reduce the transmitted data volume, thereby being capable of shortening transmission delay and saving bandwidth required by image transmission.

With respect to the device in the above embodiments, the specific operating ways of all modules have been elaborated in the embodiments with regard to the method, which will not be elaborated here.

Figure 6:
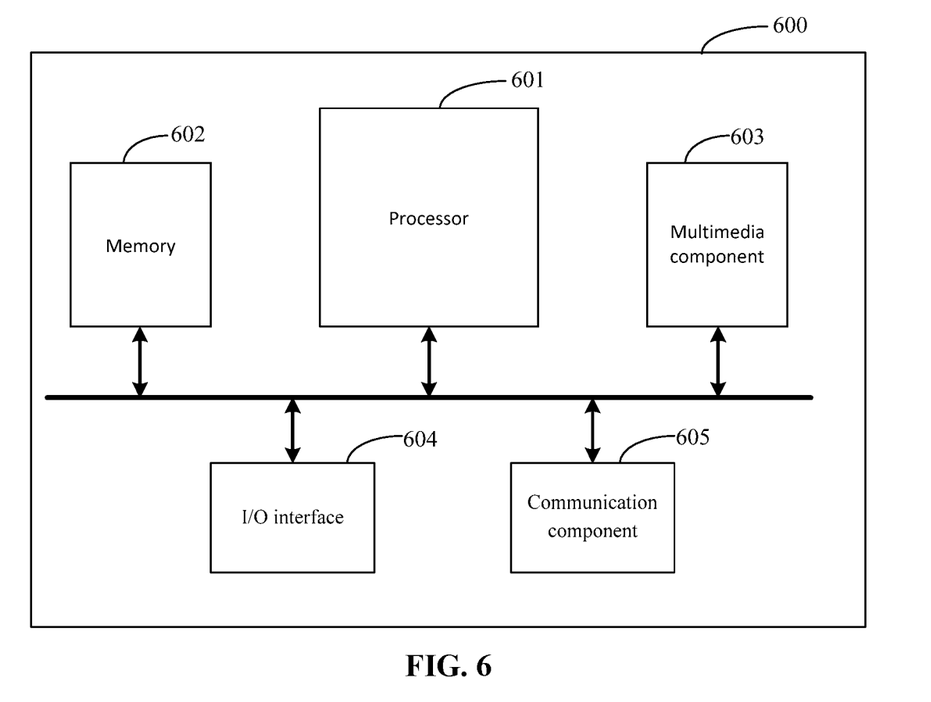
FIG. 6 shows a block diagram of a camera provided by an embodiment of the present disclosure.

FIG. 6 illustrates a block diagram of a camera 600 shown in an illustrative embodiment. As shown in FIG. 6, the camera 600 may comprise: a processor 601 and a memory 602. The camera 600 may further comprise one or a plurality of a multimedia component 603, an input/output (I/O) interface 604 and a communication component 605.

Wherein the processor 601 is configured for controlling the overall operation of the camera 600 to finish full or part of steps in the above image processing method. The memory 602 is configured for storing various kinds of data to support operation on the camera 600. These data, for instance, may include an instruction of any application or method operated on the camera 600, and the data relative to the application, including contact data, transmitted and received messages, pictures, audios and videos. The memory 602 may be realized by any kind of volatile or non-volatile memory device or combination thereof, for instance, static random access memory (SRAM for short), electrically erasable programmable read-only memory (EEPROM for short), erasable programmable read-only memory (EPROM for short), programmable read-only memory (PROM for short), read-only memory (ROM for short), magnetic memory, flash memory, magnetic disk or CD. The multimedia component 603 may include a screen and an audio component. The screen, for instance, may be a touch screen. The audio component is configured for outputting and/or inputting the audio signal. For example, the audio component may include a microphone for receiving external audio signals. The received audio signals may be further stored in the memory 602 or sent by the communication component 605. The audio component further includes at least one loudspeaker for outputting the audio signals. The I/O interface 604 provides interfaces between the processor 601 and other interface modules. The above interface modules may be keyboard, mouse and button, etc. These buttons may be virtual or physical buttons. The communication component 605 is configured for wire or wireless communication between the camera 600 and other equipments. Wireless communication, for instance, Wi-Fi, Bluetooth, near field communication (NFC for short), 2G, 3G, 4G, NB-IOT, eMTC or other 5Gs, or one or combination thereof, will not be limited here. Therefore, the corresponding communication component 605 may include: a Wi-Fi module, a Bluetooth module and an NFC module.

In one illustrative embodiment, the camera 600 may be realized to execute the above image processing method by one or a plurality of application specific integrated circuit (ASIC for short), digital signal processor (DSP for short), digital signal processing device (DSPD for short), programmable logic device (PLD for short), field programmable gate array (FPGA for short), controller, microcontroller, microprocessor or other electronic components.

In another illustrative embodiment, a computer-readable storage medium including a program instruction is provided, wherein the steps of the above image processing method are realized when the program instruction is executed by the processor. For example, the computer-readable storage medium may be the memory 602 including the program instruction which may be executed to finish the above image processing method by the processor 601 of the camera 600.

In another illustrative embodiment, a computer program product is further provided. The computer program product includes a computer program that may be executed by a programmable device, and the computer program has a code part for executing the above image processing method when executed by the programmable device.

The preferred implementations of the present disclosure are elaborated in combination with the above drawings, but the present disclosure is not limited to specific details in the above implementations. The technical solution of the present disclosure may be varied simply within the technical idea range, and these simple variants belong to the protection scope of the present disclosure. In addition, it should be noted that all specific technical features depicted in the above specific implementations may be combined by any appropriate means without contradiction. In an attempt to avoid unnecessary repetition, the present disclosure will not state various possible combination ways additionally.

Besides, different implementations of the present disclosure may be combined arbitrarily, and should be regarded as the contents disclosed by the present disclosure without departing from the idea of the present disclosure.

What is claimed is:

1. An image processing method, applied to a camera, comprising:
    capturing a target image;
    acquiring a target feature map of the target image through a preset target convolution layer, wherein the target convolution layer includes at least one of a plurality of convolution layers of a convolutional neural network (CNN); and
    outputting the target feature map;
    wherein the target convolution layer is determined in the following ways:
    acquiring a data volume of a feature map output by each of the plurality of convolution layers of the CNN, and determining the target convolution layer among the plurality of convolution layers based on the data volume; or
    obtaining a configuration information of the camera, and determining the target convolution layer among the plurality of convolution layers of the CNN according to the configuration information;
    wherein the configuration information comprises a first memory space corresponding to the camera, and the determining the target convolution layer among the plurality of convolution layers of the CNN according to the configuration information comprises:
    obtaining a second memory space required by each of the plurality of convolution layers; and
    obtaining a first sum value of the second memory space from a first convolution layer to a Nth convolution layer among the plurality of convolution layers, wherein if the first sum value is less than or equal to the first memory space and a second sum value of the second memory space from the first convolution layer to a N+1th convolution layer is greater than the first memory space, the Nth convolution layer and the previous convolution layer(s) of the Nth convolution layer among the plurality of convolution layers are used as the target convolution layers, where N is the integer greater than 0.

2. The method of claim 1, wherein the determining the target convolution layer among the plurality of convolution layers based on the data volume comprises:
    obtaining a data volume threshold;
    determining an edge convolution layer based on the data volume and the data volume threshold; and
    using the edge convolution layer and the previous convolution layer(s) of the edge convolution layer among the plurality of convolution layers as the target convolution layers.

3. The method of claim 2, wherein the obtaining a data volume threshold comprises:
    obtaining a preset bandwidth for image transmission between the camera and the CNN; and using a data volume supported by the preset bandwidth as the data volume threshold.

4. The method of claim 2, wherein the determining an edge convolution layer based on the data volume and the data volume threshold comprises:
acquiring a target data volume that is less than or equal to the data volume threshold among the data volume; and
using a convolution layer corresponding to the target data volume as the target convolution layers.

5. The method of claim 1, after outputting the target feature map, the method further comprising:
acquiring a next convolution layer of the target convolution layer among the plurality of convolution layers, and inputting the target feature map into the next convolution layer of the target convolution layer.

6. A non-transitory computer-readable storage medium on which a computer program is stored, wherein an image processing method is carried out when the program is executed by a processor; wherein the method comprises:
capturing a target image;
acquiring a target feature map of the target image through a preset target convolution layer, wherein the target convolution layer includes at least one of a plurality of convolution layers of a convolutional neural network (CNN); and
outputting the target feature map;
wherein the target convolution layer is determined in the following ways:
acquiring a data volume of a feature map output by each of the plurality of convolution layers of the CNN, and determining the target convolution layer among the plurality of convolution layers based on the data volume; or
obtaining a configuration information of the camera, and determining the target convolution layer among the plurality of convolution layers of the CNN according to the configuration information;
wherein the configuration information comprises a first memory space corresponding to the camera, and the determining the target convolution layer among the plurality of convolution layers of the CNN according to the configuration information comprises:
obtaining a second memory space required by each of the plurality of convolution layers; and
obtaining a first sum value of the second memory space from a first convolution layer to a Nth convolution layer among the plurality of convolution layers, wherein if the first sum value is less than or equal to the first memory space and a second sum value of the second memory space from the first convolution layer to a N+1th convolution layer is greater than the first memory space, the Nth convolution layer and the previous convolution layer(s) of the Nth convolution layer among the plurality of convolution layers are used as the target convolution layers, where N is the integer greater than 0.

7. A camera, comprising:
a memory on which a computer program is stored; and
a processor configured to execute the computer program in the memory to carry out an image processing method comprising:
capturing a target image;
acquiring a target feature map of the target image through a preset target convolution layer, wherein the target convolution layer includes at least one of a plurality of convolution layers of a convolutional neural network (CNN); and
outputting the target feature map;
wherein the target convolution layer is determined in the following ways:
acquiring a data volume of a feature map output by each of the plurality of convolution layers of the CNN, and determining the target convolution layer among the plurality of convolution layers based on the data volume; or
obtaining a configuration information of the camera, and determining the target convolution layer among the plurality of convolution layers of the CNN according to the configuration information;
wherein the configuration information comprises a first memory space corresponding to the camera, and the determining the target convolution layer among the plurality of convolution layers of the CNN according to the configuration information comprises:
obtaining a second memory space required by each of the plurality of convolution layers; and
obtaining a first sum value of the second memory space from a first convolution layer to a Nth convolution layer among the plurality of convolution layers, wherein if the first sum value is less than or equal to the first memory space and a second sum value of the second memory space from the first convolution layer to a N+1th convolution layer is greater than the first memory space, the Nth convolution layer and the previous convolution layer(s) of the Nth convolution layer among the plurality of convolution layers are used as the target convolution layers, where N is the integer greater than 0.

* * * * *